US008250019B2

(12) United States Patent
Paulk et al.

(10) Patent No.: US 8,250,019 B2

(45) Date of Patent: Aug. 21, 2012

(54) SYSTEM AND METHOD FOR INTERACTIVE KNOWLEDGE VISUALIZATION

(75) Inventors: Roderic W. Paulk, Richardson, TX (US); Donald R. Kretz, Plano, TX (US); John T. Crews, Dallas, TX (US); Cody W. Mahan, Richardson, TX (US)

(73) Assignee: Raytheon Company, Waltham, MA (US)

( * ) Notice: Subject to any disclaimer, the term of this patent is extended or adjusted under 35 U.S.C. 154(b) by 581 days.

(21) Appl. No.: 12/487,839

(22) Filed: Jun. 19, 2009

(65) Prior Publication Data

US 2010/0325076 A1 Dec. 23, 2010

(51) Int. Cl.

*G06F 17/00* (2006.01)
*G06F 7/00* (2006.01)
*G06N 5/02* (2006.01)

(52) U.S. Cl. .......................................... 706/47; 707/609

(58) Field of Classification Search ..................... 706/47
See application file for complete search history.

(56) References Cited

U.S. PATENT DOCUMENTS

| | | | | |
|---|---|---|---|---|
| 5,745,895 | A | 4/1998 | Bingham et al. | 707/10 |
| 6,236,994 | B1 | 5/2001 | Swartz et al. | 707/6 |
| 6,496,780 | B1 * | 12/2002 | Harris et al. | 702/3 |
| 7,428,545 | B2 | 9/2008 | Bala | 707/101 |
| 2003/0071814 | A1 * | 4/2003 | Jou et al. | 345/440 |
| 2003/0120477 | A1 * | 6/2003 | Kruk et al. | 704/2 |
| 2004/0078378 | A1 * | 4/2004 | Bala | 707/100 |
| 2006/0143231 | A1 * | 6/2006 | Boccasam et al. | 707/104.1 |
| 2009/0287814 | A1 * | 11/2009 | Robertson et al. | 709/224 |

OTHER PUBLICATIONS

Starlight Information Visualization Technologies; http://starlight.pnl.gov/; Pacific Northwest National Laboratory Operated by Battelle for the U.S. Dept. of Energy; 22 pages.

Many Eyes website; http://manyeyes.alphaworks.ibm.com/manyeyes/; Collaborative User Experience (CUE) Visual Communication Lab; IBM Watson Research Center; 62 pages.

* cited by examiner

*Primary Examiner* — Kakali Chaki
*Assistant Examiner* — Ababacar Seck
(74) *Attorney, Agent, or Firm* — Schwegman, Lundberg & Woessner, P.A.

(57) ABSTRACT

A system and method for interactive knowledge visualization are provided. In some embodiments, a method for interactive knowledge visualization includes receiving, at a knowledge visualization server, a request for one or more visualizations; retrieving data associated with the one or more visualizations from one or more databases; converting the data associated with the one or more visualizations into visualization data, the visualization data being operable to be converted by a client into the one or more visualizations; transmitting, to a first client and a second client, the visualization data; receiving, at the knowledge visualization server, a modification request from the first client, the modification request indicating a desired modification to at least one of the one or more visualizations; modifying, in response to the modification request, the visualization data associated with the one or more visualizations; and transmitting, to the first client and second client, the modified visualization data.

21 Claims, 4 Drawing Sheets

SYSTEM AND METHOD FOR INTERACTIVE KNOWLEDGE VISUALIZATION

TECHNICAL FIELD OF THE INVENTION

The present disclosure generally relates to computer-implemented knowledge visualization and, more particularly, to a system and method for interactive knowledge visualization.

BACKGROUND OF THE INVENTION

As the use of computer-implemented databases has expanded, so too has the need to present data stored in computer-implemented databases in a convenient and useful manner. The field of knowledge visualization attempts to address this need by focusing on methods for presenting large amounts of abstract data in a manner that facilitates human interaction for exploration and understanding. One way of presenting the data involves computer-implemented applications for selecting, transforming, and representing abstract data in a visual format, such as a table, graph, diagram, or figure, that facilitates human exploration and understanding. In some applications, the visualizations may also be used by one individual to explain information and concepts to another individual.

SUMMARY OF THE INVENTION

In accordance with the teachings of the present invention, a system and method for interactive knowledge visualization are provided. In a particular embodiment of the present invention, a method for interactive knowledge visualization comprises receiving, at a knowledge visualization server, a request for one or more visualizations; retrieving data associated with the one or more visualizations from one or more databases; converting the data associated with the one or more visualizations into visualization data, wherein the visualization data is operable to be converted by a client into the one or more visualizations; transmitting, to a first client and a second client, the visualization data; receiving, at the knowledge visualization server, a modification request from the first client, the modification request indicating a desired modification to at least one of the one or more visualizations; modifying, in response to the modification request, the visualization data associated with the one or more visualizations; and transmitting, to the first client and second client, the modified visualization data.

In another embodiment, a system for interactive knowledge visualization comprises logic, encoded in computer-readable media, operable, when executed by one or more processors, to perform the steps comprising receiving a request for one or more visualizations; retrieving data associated with the one or more visualizations from one or more databases; converting the data associated with the one or more visualizations into visualization data, wherein the visualization data is operable to be converted by a client into the one or more visualizations; transmitting, to a first client and a second client, the visualization data; receiving a modification request from the first client, the modification request indicating a desired modification to at least one of the one or more visualizations; modifying, in response to the modification request, the visualization data associated with the one or more visualizations; and transmitting, to the first client and second client, the modified visualization data.

In yet another embodiment, a system for interactive knowledge visualization, comprises one or more databases, and a knowledge visualization server operable to receive a request from for one or more visualizations, retrieve data associated with the one or more visualizations from the one or more databases, convert the data associated with the one or more visualizations into visualization data operable to be converted by a client into one or more visualization, transmit the visualization data to a first client and a second client, receive a modification request from the first client, the modification request indicating a desired modification to at least one of the one or more visualizations, modify the visualization data associated with one or more visualizations in response to the modification request, and transmit the modified visualization data to the first client and the second client.

A technical advantage of particular embodiments of the present invention may include the ability for a client to manipulate a visualization presented by the knowledge visualization system to customize the format of the visualization and/or the information presented in the visualization. This may allow for greater user control and flexibility regarding the content and/or presentation of the visualization.

Another technical advantage of particular embodiments of the present invention may include the ability to generate multiple visualizations based upon the same underlying data. In particular embodiments, these multiple visualization may be manipulated independently, so that changes made to one visualization are not reflected in other visualizations. In other embodiments, the visualizations may be synchronized, so that changes made to one visualization are reflected in the other visualizations.

Yet another technical advantage of particular embodiments of the present invention may include the ability for multiple clients to view the same visualizations and have changes made by one client to the visualizations reflected on the visualizations present to the other clients. In particular embodiments, this may allow for greater collaboration and better communication among the multiple clients.

It will be understood that the various embodiments of the present invention may include some, all, or none of the enumerated technical advantages. In addition other technical advantages of the present invention may be readily apparent to one skilled in the art from the figures, description, and claims included herein.

BRIEF DESCRIPTION OF THE DRAWINGS

For a more complete understanding of the present invention and features and advantages thereof, reference is now made to the following description, taken in conjunction with the accompanying drawings, in which.

DETAILED DESCRIPTION OF THE INVENTION

In accordance with the teachings of the present invention, a system and method for interactive, synchronized knowledge visualization are provided. In a particular embodiment of the present invention, a method for interactive knowledge visualization comprises receiving, at a knowledge visualization server, a request for one or more visualizations; retrieving data associated with the one or more visualizations from one or more databases; converting the data associated with the one or more visualizations into visualization data, wherein the visualization data is operable to be converted by a client into the one or more visualizations; transmitting, to a first client and a second client, the visualization data; receiving, at the knowledge visualization server, a modification request from the first client, the modification request indicating a desired modification to at least one of the one or more visualizations; modifying, in response to the modification request, the visualization data associated with the one or more visualizations; and transmitting, to the first client and second client, the modified visualization data.

By allowing one or more clients to access data stored in one or more databases and manipulate visualizations based upon that data, particular embodiments of the present invention may allow for greater user flexibility in how the data is presented. In particular embodiments, users may access multiple visualizations that may be manipulated independently or synchronously. User may also be able to access data in disparate formats, from different databases, and have the data presented in a cohesive visualization. By using inference rules, particular embodiments may also be able to classify the data presented based upon one or more known attributes of the data, helping the users to glean more information about the underlying data from the visualization.

Figure 1:
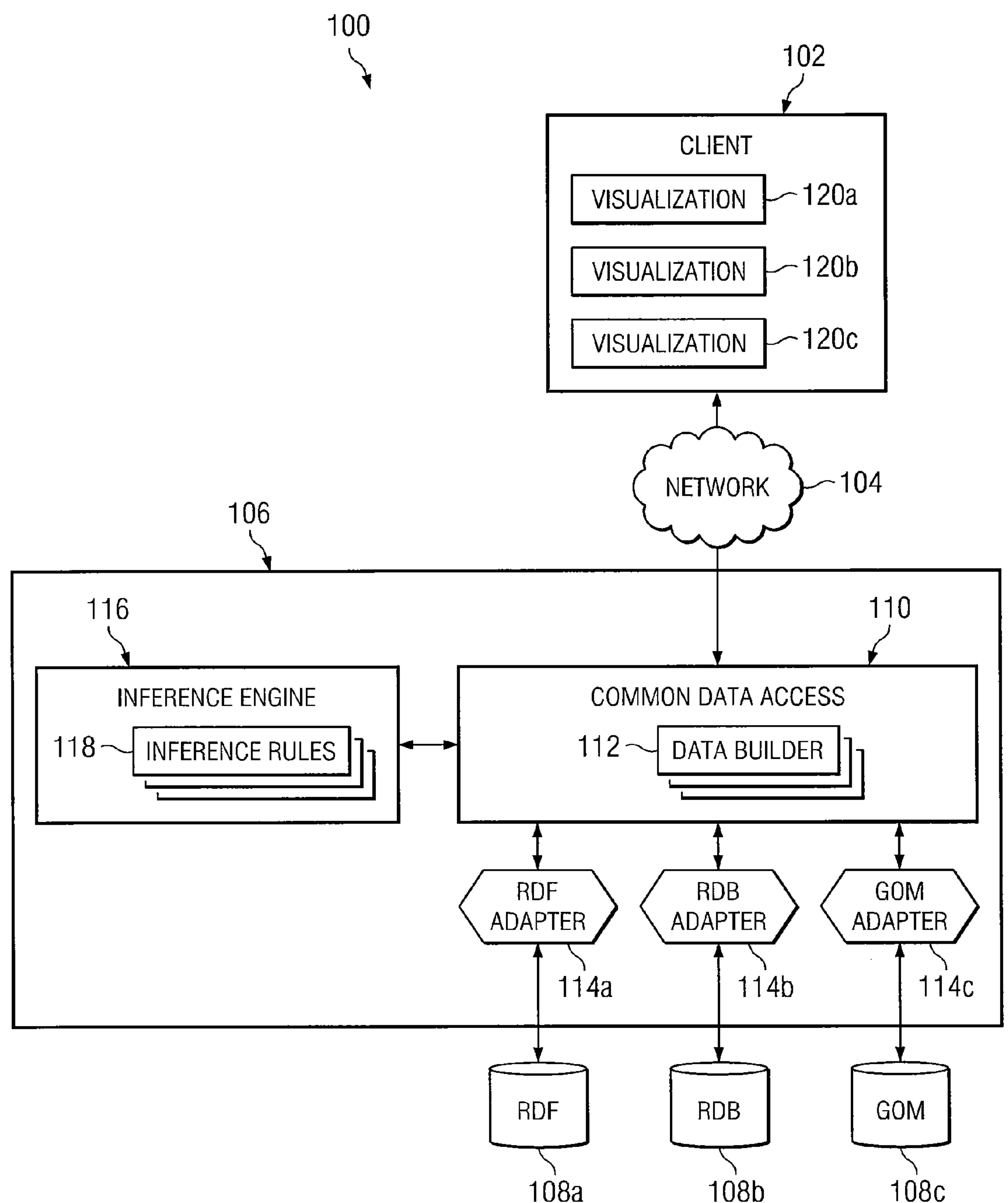
FIG. 1 illustrates a single-user system for interactive knowledge visualization in accordance with a particular embodiment of the present invention.

FIG. 1 illustrates an interactive knowledge visualization system 100 in accordance with a particular embodiment of the present invention. Generally, system 100 is a single-user system, having a single client 102. As shown in FIG. 1, system 100 comprises client 102, network 104, knowledge visualization server 106, and one or more databases 108. In response to a request from client 102, knowledge visualization server 106 retrieves data from databases 108, converts the data into visualization data, which may be converted by client 102 into a visualization, and transmits the visualization data to client 102. Client 102 may then convert the visualization data into one or more graphical representations, or "visualizations," of the data retrieved from databases 108. In particular embodiments, these visualizations may include, but are not limited to bar graphs, line graphs, pie graphs, tables, diagrams, figures or any other suitable visualization. In particular embodiments, client 102 may also submit modification requests to knowledge visualization server 106 to customize the formatting of the visualizations, to view additional or different data in the visualizations, and/or to change or delete the underlying data in databases 108*a-c*.

Generally, client 102 may comprise any combination of hardware and/or software operable to communicate with knowledge visualization server 106 and display the visualization data received from server 106 as a visualization 120. In particular embodiments, client 102 may have the ability to display multiple visualizations 120*a-c* based upon the visualization data received from server 106. In particular embodiments, these multiple visualizations 120*a-c* may be synchronized so that changes to one visualization are reflected in the other visualizations. In other embodiments, visualizations 120*a-c* may be independent so that changes to one visualization are not reflected in the other visualizations. In yet other embodiments, the multiple visualizations 120*a-c* may comprise both synchronized and independent visualizations. For example, visualizations 120*a* and 120*b* may be synchronized, while visualization 120*c* may be independent.

As shown in FIG. 1, client 102 communicates with knowledge visualization server 106 through network 104. Generally, network 104 may comprise any suitable communications network, including but not limited to the Internet, a local area network ("LAN"), a wide area network ("WAN"), a metropolitan area network ("MAN"), a campus area network ("CAN"), a virtual private network ("VPN"), and/or a wireless network.

Client 102 communicates with knowledge visualization server 106 through network 104 to request one or more visualizations based upon data stored in one or more databases 108. Generally, databases 108 may comprise any suitable databases. Examples of suitable databases include, but are not limited to, resource description framework ("RDF") databases, relational databases ("RDB"), and generic object model ("GOM") databases. With the benefit of this disclosure, one of ordinary skill in the art should be able to identify other suitable databases. As shown in FIG. 1, system 100 comprises a RDF database 104*a*, a RDB database 104*b*, and a GOM database 104*c*.

Generally, knowledge visualization server 106 retrieves data from databases 108, converts the retrieved data into visualization data that may be converted into a visualization by client 102, and transmits the visualization data to client 102. In particular embodiments, knowledge visualization server 106 comprises a common data access interface 110. Generally, common data access interface 110 receives a request for a visualization from client 102, retrieves data associated with the visualization from databases 108, converts the data into visualization data, and pushes the visualization data to client 102 for the client to present as a visualization 120. Based upon further requests from client 102, common data access interface 110 may also change the formatting of a visualization 120, retrieve additional data from databases 108 to be used in a visualization 120, or modify the data in databases 108 underlying a visualization 120. Generally, common data access interface 110 may comprise any suitable combination of hardware and/or software. In particular embodiments, common data access interface 110 may be a software module executed on knowledge visualization server 106.

Upon a request from client 108 for a particular visualization, common data access interface 110 retrieves data associated with the visualization from databases 108. Upon receipt of the data from databases 108, common data access interface 110 converts the data into visualization data, suitable for presenting to client 102 for use in a visualization. In particular embodiments, suitable formats may include, but are not limited to, XML customized for visualization.

In particular embodiments, the conversion of the retrieved data into visualization data may be performed by one or more data builder modules 112. Generally, data builder modules 112 may aggregate the data retrieved from databases 108, parse the data for information relevant to a requested visualization, and convert the data into a visualization data format suitable for client 102. In particular embodiment, data builder modules 112 may comprise one or more pluggable modules, so that the capabilities of common data access interface 110 may be extended by added additional data builder plug-ins with additional capabilities, to common data access interface 110. For example, one data builder module could correspond to bar-graph-type visualizations, whereas another data builder module could correspond to line-graph-type visualizations. By adding or removing various data builder modules 112, system 100 may be configurable to allow clients to access different types of visualizations having different types of formatting options.

Knowledge visualization server 106 may also comprise an inference engine 116 operable to apply one or more inference rules 118 to the data retrieved from databases 108 to help the user of client 102 glean additional information from the visualizations. In particular embodiments, this entails applying first-order logic inference rules to the data. For example, based upon known attributes of the data, various inferences may be made about the underlying data and applied to the visualization. In particular embodiments, these inference rules 118 may be used by inference engine 116 to classify the requested data based upon known attributes of the data. With the benefit of this disclosure, one or ordinary skill in the other should be able to recognize other inference rules that may be suitable for use in accordance with the teachings of the present disclosure. In particular embodiments, these inference rules 118 may be configurable by client 102 and/or a system administrator (not shown) of system 100.

In particular embodiments, knowledge visualization server 106 may also comprise one or more database format adapters 114. These adapters 114 allow common data access interface 110 to access databases comprising disparate and incompatible formats. Generally, adapters 114 are operable to convert data retrieved from the databases 108 into a format suitable for use by knowledge visualization server 106. As shown in FIG. 1, knowledge visualization server 106 includes an RDF adapter **114*a*, a RDB adapter 114*b*, and a GOM adapter 114*c*. RDF adapter 114*a* receives data from RDF database 108*a* and converts it into a format suitable for use by common data access interface 110; RDB adapter 114*b* receives data from RDB database 108*b* and converts it into a format suitable for use by common data access interface 110; and GOM adapter 114*c* receives data from GOM database 108*c* and converts it into a format suitable for use by common data access interface 110. The particular format into which the data is converted may depend upon the configuration of common data access interface 110 and of the adapters 114. In general, these database format adapters 114 may comprise any suitable combination of hardware and/or software. In particular embodiments, the adapters 114 may be standalone modules, or may be incorporated into databases 108 and/or common data access interface 110**.

After the data associated with the requested visualization is converted into visualization data and any applicable inference rules are applied, common data access interface 110 transmits the visualization data to client 102 to be presented in one or more visualizations 120. For example, FIG. 1 illustrates client 102 viewing three visualizations **120*a-c***. In particular embodiments, these visualization may be based upon the same or different underlying data.

In particular embodiments of the present invention, the user of client 108 may customize and/or modify the visualizations 120 presented by common data access interface 110. For example, in particular embodiments, the user of client 102 may change the visual appearance of the visualization 120. In particular embodiments, this may comprise altering the color, shape, size, and or font of various portions of visualization 120. In other embodiments, the user of client 102 may request to expand the data represented in visualization 120 to include other data in databases 108 and/or remove some data already included in the visualization. In other embodiments, the user of client 102 may even be allowed to alter the underlying data in database 108. In these such embodiments, client 102 may makes a request to common data access interface 110 to modify the visualization 120. Common data access interface 110 receives the request to modify the visualization 120 and handles it accordingly. If the request is for a formatting change to visualization 120, common data access interface 110 pushes modified visualization data to client 102 for visualization 120. If different or additional data is requested, common data access interface 110 retrieves the data from database 108, converts the data for presentation to client 102, and pushes the modified visualization data to client 101, as discussed above. If client 102 requests to modify the underlying data in databases 108, common data access interface 110 updates the data in databases 108 to reflect the requested change, retrieves the revised data from databases 108, converts the data for presentation to client 102, and pushes the modified visualization data to client 102, as discussed above.

Because the visualization data is pushed to client 102 upon an update to the underlying data or a change to the visualization, in particular embodiments, client 102 does not need to periodically ping common data access interface 110 for updates. Instead, updates are automatically pushed to client 102 when they are available. In this fashion, the data transfer between common data access interface 110 and client 102 may be referred to as asynchronous.

As mentioned above, in particular embodiments, client 102 may have multiple visualization 120, which may be independent or synchronized, running concurrently. A better understanding of this capability may be had by making reference to FIGS. 2 and 3.

Figure 2:
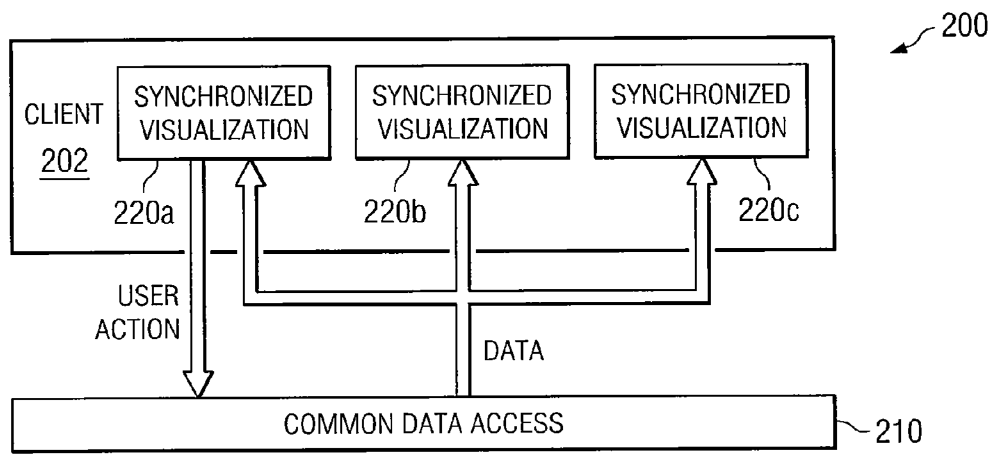
FIG. 2 illustrates interactive, synchronized knowledge visualization in accordance with a single-user embodiment of the present invention.

FIG. 2 illustrates a portion of a system 200 for interactive knowledge visualization in which a client 208 is running multiple synchronized visualizations 210. Generally, system 200 is similar to system 100 depicted in FIG. 1; however, for simplicity, only common data access interface 210 and client 202 of system 200 are illustrated. As shown in FIG. 2, client 202 is running three synchronized visualizations **220*a*, 220*b*, and 220*c*. The visualizations 220 may be referred to as synchronized because changes made to one visualization by the user of client 202 are also reflected in the other visualizations. In such a system, client 202 submits a change for one of the visualizations, in this example visualization 220*a*, to common data access interface 210. Common data access interface 210 makes the requisite changes to the underlying data and/or visualization data, and pushes the updated visualization data to all three synchronized visualizations 220. In this manner, a change to one of the visualizations is reflected in all the synchronized visualizations. Accordingly, a user may make a global change to multiple visualizations 220 running on client 202 by merely submitting the changes to common data access interface 210 with regard to one of the visualizations 220**.

Figure 3:
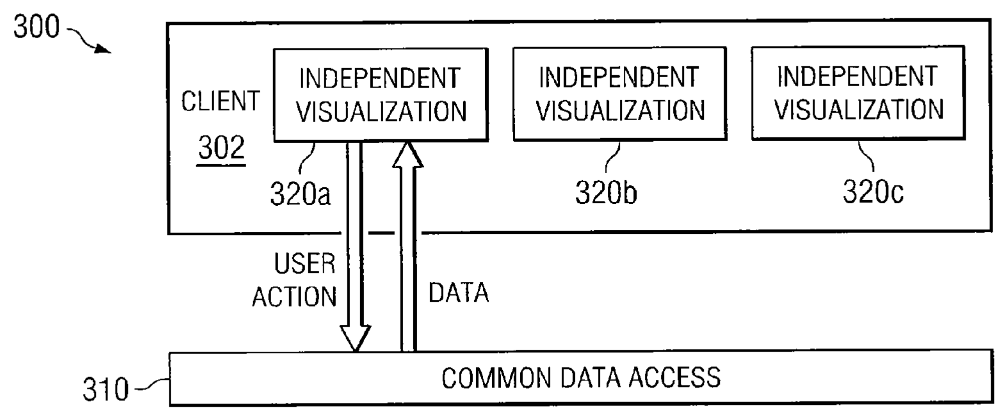
FIG. 3 illustrates interactive, independent knowledge visualization in accordance with a single-user embodiment of the present invention

FIG. 3, in comparison, illustrates a portion of a system 300 for interactive knowledge visualization in which a client 302 is running multiple independent visualizations 320. Again, system 300 is generally similar to system 100 depicted in FIG. 1; however, for simplicity, only common data access interface 310 and client 302 of system 300 are illustrated. A shown in FIG. 3, client 302 is running three independent visualizations **320*a*, 320*b*, and 310*c*. The visualizations 320 may be referred to as independent because changes made to one visualization by the user of client 302 are not reflected in the other visualizations. In such a system, client 302 submits a change for one of the visualizations, in this example visualization 320*a*, to common data access interface 310. Common data access interface 310 makes the requisite changes to the underlying data and/or visualization data, and pushes the updated visualization data only to visualization 320***a*. Visualizations 320*b* and 320*c* are unaffected, and may be referred to as locked relative to visualization 320*a*. In this manner, a user may manipulate one of the visualizations 320 without affecting the other visualizations running on client 302.

Figure 4:
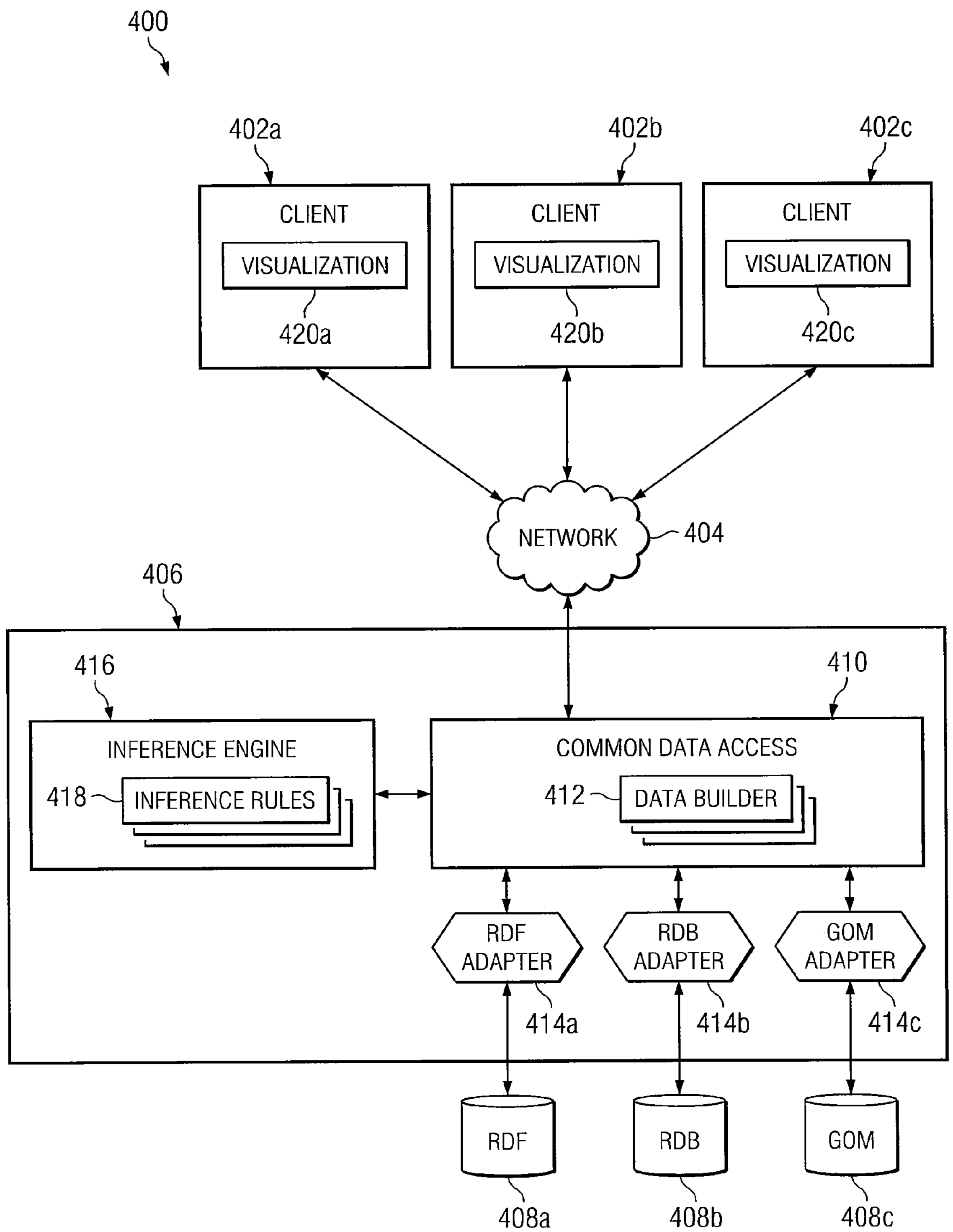
FIG. 4 illustrates a multi-user system for interactive, synchronized knowledge visualization in accordance with a particular embodiment of the present invention.

Particular embodiments of the present invention may also offer the ability for multiple users to contemporaneously view visualizations using the same interactive knowledge visualization system. In these embodiments, the visualizations may be independent, or the visualizations may be synchronized to that the visualizations may facilitate collaboration and/or knowledge transfer between the users. FIG. 4 illustrates one such embodiment.

FIG. 4 illustrates a system 400, which is a multi-user system for interactive knowledge visualization in accordance with a particular embodiment of the present invention. As shown in FIG. 4, system 400 comprises clients 402, network 404, knowledge visualization server 406, and one or more databases 408

Generally, clients 402 may each comprise any combination of hardware and/or software operable to communicate with knowledge visualization server 406 and display the visualization data received from server 406 as a visualization 420. In particular embodiments, each client 402 may have the ability to display multiple visualizations 420 based upon visualization data received from server 406. In particular embodiments, these multiple visualizations 420 may be synchronized, independent, or any combination thereof. Clients 402 communicate with knowledge visualization server 406 through network 404, which may comprise any suitable communications network, including but not limited to the Internet, a LAN, a WAN, a MAN, a CAN, a VPN, and/or a wireless network.

Clients 402 communicate with knowledge visualization server 406 through network 404 to request one or more visualizations based upon data stored in databases 408. Generally, databases 408 may comprise any suitable databases, including but not limited to, RDF databases, RDB databases, and GOM databases. As shown in FIG. 1, system 400 comprises a RDF database 404*a*, a RDB database 404*b*, and a GOM database 404*c*.

Generally, knowledge visualization server 406 retrieves data from databases 408, converts the retrieved data into visualization data that may be converted into a visualization by one or more clients 402, and transmits the visualization data to the respective client(s) 402. Similar to knowledge visualization server 106, knowledge visualization server 406 may also comprise a common data access interface 410. Generally, common data access interface 410 receives a request for a visualization from one or more clients 402, retrieves data associated with the visualization from databases 408, converts the data into visualization data, and pushes the visualization data to the respective client(s) 402 for the client(s) to present as a visualization 420. Based upon further requests from one of the clients 402, common data access interface 410 may also change the formatting of a visualization 420, retrieve additional data from databases 408 to be used in a visualization 420, or modify the data in databases 408 underlying a visualization 420. Generally, common data access interface 410 may comprise any suitable combination of hardware and/or software. In particular embodiments, common data access interface 410 may be a software module executed on knowledge visualization server 406.

Upon a request from a client 408 to for a particular visualization, common data access interface 410 retrieves data associated with the visualization from databases 408. Upon receipt of the data from databases 408, common data access interface 410 converts the data into visualization data, suitable for presenting to client 402 for use in a visualization. In particular embodiments, suitable formats may include, but are not limited to, XML customized for visualization.

Similar to knowledge visualization server 106, the conversion of the retrieved data into visualization data may be performed by one or more data builder modules 412. Generally, data builder modules 412 may aggregate the data retrieved from databases 408, parse the data for information relevant to a requested visualization, and convert the data into a visualization data format suitable for clients 402. In particular embodiment, data builder modules 412 may comprise one or more pluggable modules, so that the capabilities of common data access interface 410 may be extended by added additional data builder plug-ins with additional capabilities, to common data access interface 410. By adding or removing various data builder modules 412, system 400 may be configurable to allow clients to access different types of visualizations having different types of formatting options.

Knowledge visualization server 406 may also comprise an inference engine 416 operable to apply one or more inference rules 418 to the data retrieved from databases 108 to help the user of client 102 glean additional information from the visualizations. In particular embodiments, these inference rules 418 may also be configurable by a client 402 and/or a system administrator (not shown) of system 400.

In particular embodiments, knowledge visualization server 406 may also comprise one or more database format adapters 414. These adapters 414 allow common data access interface 110 to access databases comprising disparate and incompatible formats. Generally, adapters 414 are operable to operable to convert data retrieved from the databases 408 into a format suitable for use by knowledge visualization server 406. As shown in FIG. 4, knowledge visualization server 106 includes an RDF adapter 414*a*, a RDB adapter 414*b*, and a GOM adapter 414*c*. RDF adapter 414*a* receives data from RDF database 408*a* and converts it into a format suitable for use by common data access interface 410; RDB adapter 414*b* receives data from RDB database 408*b* and converts it into a format suitable for use by common data access interface 410; and GOM adapter 414*c* receives data from GOM database 408*c* and converts it into a format suitable for use by common data access interface 410. The particular format into which the data is converted may depend upon the configuration of common data access interface 410 and of the adapters 414. In general, these database format adapters 414 may comprise any suitable combination of hardware and/or software. In particular embodiments, the adapters 414 may be standalone modules, or may be incorporated into databases 408 and/or common data access interface 410.

After the data associated with the requested visualization is converted into visualization data and any applicable inference rules are applied, common data access interface 410 may transmit the visualization data to one or more client 402 to be presented in one or more visualizations 420. For example, FIG. 4 illustrates clients 402*a*, 402*b*, and 402*c* viewing visualizations 420*a*, 420*b*, and 420*c*, respectively. In particular embodiments, these visualizations may be based upon the same or different underlying data.

In particular embodiments of the present invention, the user of a client 408 may customize and/or modify a visualizations 420 presented by common data access interface 410. For example, in particular embodiments, the user of a client 402 may change the visual appearance of the visualization 420, expand the data represented in visualization 420 to include other data in databases 408 and/or remove some data already included in the visualization, and/or alter the underlying data in database 408. In these such embodiments, the client 402 may make a request to common data access interface 410 to modify the visualization 420. Common data access interface 410 receives the request to modify the visualization 420 and handles it accordingly. If the request is for a formatting change to visualization 420, common data access interface 410 pushes modified visualization data to the client 402. If different or additional data is requested, common data access interface 410 retrieves the data from database 408, converts the data for presentation to client 401, and pushes the modified visualization data to client 401, as discussed above. If client 402 requests to modify the underlying data in databases 408, common data access interface 110 updates the data in databases 408 to reflect the requested change, retrieves the revised data from databases 408, converts the data for presentation to client 402, and pushes the modified visualization data to client 402, as discussed above.

As mentioned above, in particular embodiments, clients 402 may have view the same visualization 420. In such an embodiment, visualizations 420*a*, 420*b*, and 420*c* would be identical. In some embodiments, the visualizations 420 may also be collaborative, in that a change made by one client 402 to its respective visualization 420 is reflected in the respective visualizations 420 of the other clients 402. A better understanding of this capability may be had by making reference to FIG. 5.

Figure 5:
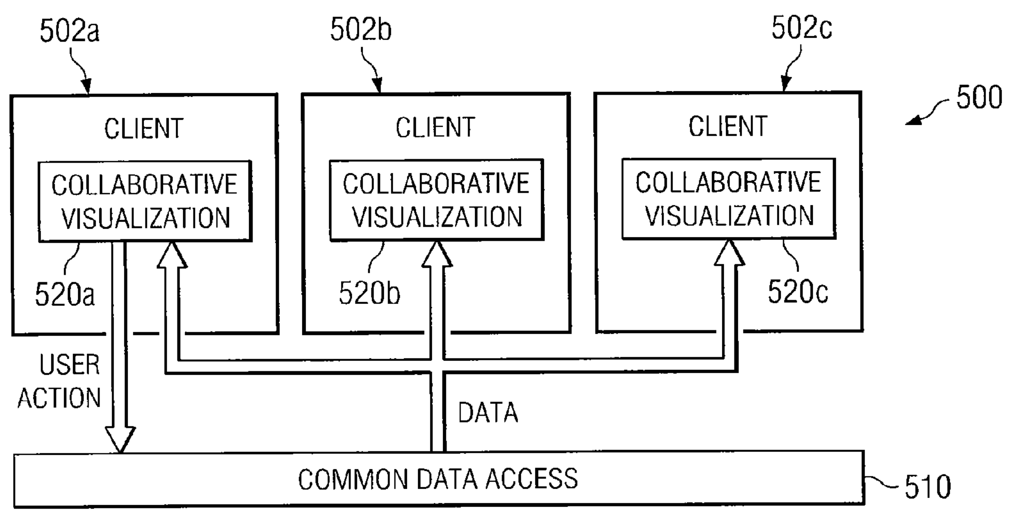
FIG. 5 illustrates interactive, collaborative knowledge visualization in accordance with a multi-user embodiment of the present invention.

FIG. 5 illustrates a portion of a system 500 for interactive knowledge visualization in which multiple clients 502 may view one or more synchronized, collaborative visualization 520. Generally, system 500 is similar to system 400 depicted in FIG. 4; however, for simplicity, only common data access interface 510 and clients 502 of system 500 are illustrated. As shown in FIG. 5, clients 502*a*, 502*b*, and 502*c* are each running a respective version of collaborative visualization 520. Visualizations 520 may be referred to as collaborative in that the changes made by one user to his or her respectively visualization is also reflected in the visualizations of the other users. In this manner, the users may use the visualizations to communicate information about the visualizations and the underlying data to each other using system 500. In such a system, clients 502*a-c* may view the same visualization 520 on their respective machines. Client 502*a* may submit a change to its visualization, in this case visualization 520*a*, to common data access interface 510. Common data access interface 510 makes the requisite changes to the underlying data and/or visualization data, and pushes the updated visualization data to all three collaborative visualizations 520*a-c*.

In particular embodiments, the ability of the clients to alter a collaborative visualization may be restricted based upon one or more privileges associated with the various clients. For example, in a particular embodiment, the clients may be assigned one of three roles: administrator, user, and visitor. An administrator may be allowed to modify a visualization, the underlying data in the databases, and or configure the inference rules of the knowledge visualization server. A user, on the other hand, may only be able to modify the visualization, but not the underlying data or inference rules. Lastly, the visitor may be allowed to view the collaborative visualization, but not modify the visualization, the data, or the inference rules. In other embodiments, other roles with other respective privileges may be assigned to the various clients, all within the teachings of the present disclosure. With the benefit of this disclosure, one of ordinary skill in the art should be able to identify other suitable embodiments.

Figure 6:
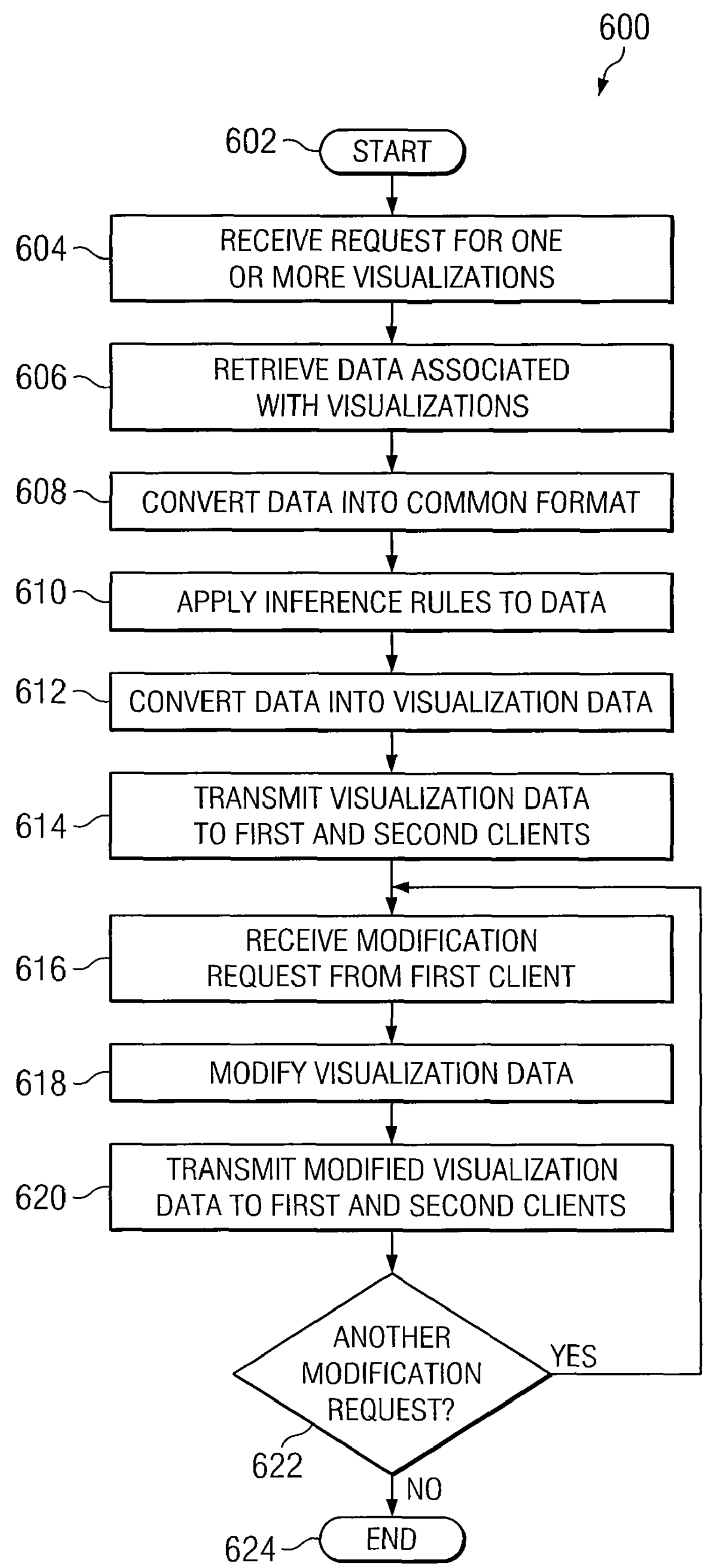
FIG. 6 illustrates a flowchart of a method for interactive knowledge visualization in accordance with a particular embodiment of the present invention.

FIG. 6 illustrates a flowchart 600 of a method for interactive knowledge visualization in accordance with a particular embodiment of the present invention. In embodiment illustrated in flowchart 600, a first and second client utilize a knowledge visualization server to view a collaborative visualization.

Flowchart 600 begins at step 602. At step 604, a knowledge visualization server receives a request for one or more visualizations. At step 606, the knowledge visualization server retrieves data associated with the one or more visualizations from one or more databases communicatively coupled to the server. In the even the data from the databases is in disparate, incompatible formats, the data is converted into a common format compatible with the knowledge visualization server at step 608.

Using an inference engine, the knowledge visualization server applies one or more inference rules to the data associated with the one or more visualizations at step 610. In particular embodiments, these may comprise first-order logic inference rules. Using the inference rules, the inference engine may be able to make classifications based upon known attributes of the data.

After the application of the inference rules by the inference engine, at step 612, knowledge server converts the data associated with the one or more visualizations into visualization data, formatted such that one or more clients may convert the visualization data into one or more visualizations. The visualization data is then transmitted to the first and second clients at step 614.

At step 616, the knowledge visualization server receives a modification request from the first client. In particular embodiments, this modification request may comprise to customize and/or modify the one or more visualizations based upon the visualization data. For example, the first client may wish change the visual appearance of the visualization, expand the data represented in visualization to include other data and/or remove some data already included in the visualization, or even alter the underlying data in the database.

In response to the modification request, at step 618, the knowledge visualization server modifies the visualization data according to the modification request, and at step 620, the server transmits the modified visualization data to both the first and second clients. In this way, any changes submitted by the first client, are also reflected on the second client's visualization.

At step 622, the server determines if there are additional modification requests from the first client. If there are additional modification requests, the flowchart returns to step 616, where the knowledge visualization server receives the next modification request from the first client. However, if there are no additional modification requests, flowchart 600 terminates at step 624.

Accordingly, particular embodiments of the present invention allow one or more clients the ability to manipulate visualizations to customize the format of the visualization and/or the information presented in the visualization. By plugging in additional data builder modules, particular embodiments may also over the ability to extend the capabilities of the knowledge visualization server. Particular embodiments may also include the ability to generate multiple visualizations based upon the same underlying data. In particular embodiments, these multiple visualization may be independent, synchronized, or any combination thereof. Particular embodiments may also offer the ability for multiple clients to view the same visualizations and have changes made by one client to the visualizations reflected on the visualizations present to the other clients. In particular embodiments, this may allow for greater collaboration and better communication among the multiple clients.

In a particular embodiment of the present invention, a method for interactive knowledge visualization comprises receiving, at a knowledge visualization server, a request for one or more visualizations; retrieving data associated with the one or more visualizations from one or more databases; converting the data associated with the one or more visualizations into visualization data, the visualization data operable to be converted by a client into the one or more visualizations; transmitting, to a first client and a second client, the visualization data; receiving, at the knowledge visualization server, a modification request from the first client, the modification request indicating a desired modification to at least one of the one or more visualizations; modifying, in response to the modification request, the visualization data associated with the one or more visualizations; and transmitting, to the first client and second client, the modified visualization data.

In another embodiment, a system for interactive knowledge visualization comprises logic, encoded in computer-readable media, operable, when executed by one or more processors, to perform the steps comprising receiving a request for one or more visualizations; retrieving data associated with the one or more visualizations from one or more databases; converting the data associated with the one or more visualizations into visualization data, the visualization data operable to be converted by a client into the one or more visualizations; transmitting, to a first client and a second client, the visualization data; receiving a modification request from the first client, the modification request indicating a desired modification to at least one of the one or more visualizations; modifying, in response to the modification request, the visualization data associated with the one or more visualizations; and transmitting, to the first client and second client, the modified visualization data.

In yet another embodiment, a system for interactive knowledge visualization, comprises one or more databases, and a knowledge visualization server operable to receive a request from for one or more visualizations, retrieve data associated with the one or more visualizations from the one or more databases, convert the data associated with the one or more visualizations into visualization data operable to be converted by a client into one or more visualization, transmit the visualization data to a first client and a second client, receive a modification request from the first client, the modification request indicating a desired modification to at least one of the one or more visualizations, modify the visualization data associated with one or more visualizations in response to the modification request, and transmit the modified visualization data to the first client and the second client.

Although particular embodiments of the method and apparatus of the present invention have been illustrated in the accompanying drawings and described in the foregoing detailed description, it will be understood that the invention is not limited to the embodiments disclosed, but is capable of numerous rearrangements, modifications, and substitutions without departing from the spirit of the invention as set forth and defined by the following claims.

What is claimed is:

1. A system for interactive knowledge visualization, comprising:

one or more databases; and a knowledge visualization server operable to:

receive a request for one or more visualizations;

retrieve data associated with the one or more visualizations from the one or more databases;

convert the data associated with the one or more visualizations into visualization data operable to be converted by a client into the one or more visualization;

transmit the visualization data to a first client and a second client, the first client corresponding to a first user and the second client corresponding to a second user different from the first user;

receive a modification request from the first client, the modification request indicating a desired modification to at least one visualization of the one or more visualizations;

modify the visualization data associated with the at least one visualization in response to the modification request received from the first client; and automatically transmit the visualization data modified in response to the modification request to the first client and the second client, the automatically transmitting including:

determining whether a visualization mode associated with the at least one visualization is a synchronized mode or an independent mode;

responsive to a first indication that the visualization mode is the synchronized mode, pushing the modified visualization data to the at least one visualization and one or more additional visualizations of the one or more visualizations in each of the first and second clients; and responsive to a second indication that the visualization mode is the independent mode, pushing the modified visualization data only to the at least one visualization in each of the first and second clients.

2. The system of claim 1, wherein one or more visualizations comprise a member selected from the group consisting of a bar graph, a line graph, a pie graph, a table, and a diagram.

3. The system of claim 1, wherein the desired modification to the one or more visualizations comprises a formatting change to the one or more visualizations, and wherein the modifying of the visualization data associated with the one or more visualizations comprises modifying the visualization data to reflect the formatting change.

4. The system of claim 1, wherein the desired modification to the one or more visualizations comprises a modification to the requested data, and wherein the modifying of the visualization data comprises:

updating the data associated with the one or more visualization in the one or more databases;

retrieving the updated data associated with the one or more visualization from the one or more databases; and converting the updated data associated with the one or more visualizations into modified visualization data.

5. The system of claim 1, wherein the desired modification to the one or more visualizations comprises a request to view additional data in the one or more visualization, and wherein the modifying of the one or more visualizations comprises retrieving the additional data from the one or more databases, and converting the additional data into modified visualization data.

6. The system of claim 1, wherein the knowledge visualization server further comprises one or more data builder modules, the data builder modules operable to convert the data associated with the one or more visualizations into visualization data.

7. The system of claim 1, wherein the knowledge visualization server further comprises an inference engine operable to apply one or more inference rules to the data associated with the one or more visualizations to classify the data based at least in part upon attributes of the data.

8. The system of claim 1, further comprising:

one or more database format adapters operable to convert the data associated with the one or more visualizations into a format compatible with the knowledge visualization server.

9. A method for interactive knowledge visualization, comprising:

receiving, at a knowledge visualization server, a request for one or more visualizations;

retrieving data associated with the one or more visualizations from one or more databases;

converting the data associated with the one or more visualizations into visualization data, the visualization data operable to be converted by a client into the one or more visualizations;

transmitting, to a first client and a second client, the visualization data, the first client corresponding to a first user and the second client corresponding to a second user different from the first user;

receiving, at the knowledge visualization server, a modification request from the first client, the modification request indicating a desired modification to at least one visualization of the one or more visualizations;

modifying, in response to the modification request received from the first client, the visualization data associated with the at least one visualization; and automatically transmitting, to the first client and second client, the visualization data modified in response to the modification request, the automatically transmitting including:

determining whether a visualization mode associated with the at least one visualization is a synchronized mode or an independent mode;

responsive to a first indication that the visualization mode is the synchronized mode, pushing the modified visualization data to the at least one visualization and one or more additional visualizations of the one or more visualizations in each of the first and second clients; and responsive to a second indication that the visualization mode is the independent mode, pushing the modified visualization data only to the at least one visualization in each of the first and second clients.

10. The method of claim 9, wherein the desired modification to the one or more visualizations comprises a formatting change to the one or more visualizations, and wherein the modifying of the visualization data associated with the one or more visualizations comprises modifying the visualization data to reflect the formatting change.

11. The method of claim 9, wherein the desired modification to the one or more visualizations comprises a modification to the requested data, and wherein the modifying of the visualization data comprises:

updating the data associated with the one or more visualization in the one or more databases;

retrieving the updated data associated with the one or more visualization from the one or more databases; and converting the updated data associated with the one or more visualizations into modified visualization data.

12. The method of claim 9, wherein the desired modification to the one or more visualizations comprises a request to view additional data in the one or more visualization, and wherein the modifying of the one or more visualizations comprises retrieving the additional data from the one or more databases, and converting the additional data into modified visualization data.

13. The method of claim 9, further comprising:

applying one or more inference rules to the data associated with the one or more visualizations, the one or more inference rules operable to classify the data based upon one or more attributes of the data.

14. The method of claim 9, wherein the data associated with the one or more visualizations comprises multiple formats, and wherein the retrieving of the data from the one or more databases comprises converting the data into a common format compatible with the knowledge visualization server.

15. A non-transitory computer-readable storage device storing instructions that, when executed by one or more processors, configure the one or more processors to:

receive a request for one or more visualizations;

retrieve data associated with the one or more visualizations from one or more databases;

convert the data associated with the one or more visualizations into visualization data, the visualization data operable to be converted by a client into the one or more visualizations;

transmit, to a first client and a second client, the visualization data, the first client corresponding to a first user and the second client corresponding to a second user different from the first user;

receive a modification request from the first client, the modification request indicating a desired modification to at least one visualization of the one or more visualizations;

modify, in response to the modification request received from the first client, the visualization data associated with the at least one visualization; and automatically transmit, to the first client and second client, the visualization data modified in response to the modification request, the automatically transmitting including:

determining whether a visualization mode associated with the at least one visualization is a synchronized mode or an independent mode;

responsive to a first indication that the visualization mode is the synchronized mode, pushing the modified visualization data to the at least one visualization and one or more additional visualizations of the one or more visualizations in each of the first and second clients; and responsive to a second indication that the visualization mode is the independent mode, pushing the modified visualization data only to the at least one visualization in each of the first and second clients.

16. The storage device of claim 15, wherein the desired modification to the one or more visualizations comprises a formatting change to the one or more visualizations and wherein the modifying of the visualization data associated with the one or more visualizations comprises modifying the visualization data to reflect the formatting change.

17. The storage device of claim 15, wherein the desired modification to the one or more visualizations comprises a modification to the requested data, and wherein the modifying of the visualization data comprises:

updating the data associated with the one or more visualization in the one or more databases;

retrieving the updated data associated with the one or more visualization from the one or more databases; and converting the updated data associated with the one or more visualizations into modified visualization data.

18. The storage device of claim 15, wherein the desired modification to the one or more visualizations comprises a request to view additional data in the one or more visualization, and wherein the modifying of the one or more visualizations comprises retrieving the additional data from the one or more databases, and converting the additional data into modified visualization data.

19. The storage device of claim 15, further comprising:

applying one or more inference rules to the data associated with the one or more visualizations, the one or more inference rules operable to classify the data based upon one or more attributes of the data.

20. The storage device of claim 15, wherein the data associated with the one or more visualizations comprises multiple formats, and wherein the retrieving of the data from the one or more databases comprises converting the data into a common format compatible with the knowledge visualization server.

21. An apparatus for interactive knowledge visualization, comprising:

memory to store data associated with visualizations; and one or more processors to execute a knowledge visualization tool configured to:

receive a request for one or more visualizations;

retrieve data associated with the one or more visualizations from the memory;

convert the data associated with the one or more visualizations into visualization data operable to be converted by a client into the one or more visualization including a first visualization and a second visualization different from the first visualization;

transmit the visualization data to a first client and a second client, the first client corresponding to a first user and the second client corresponding to a second user different from the first user;

receive a modification request from the first client, the modification request indicating a desired modification to the first visualization;

modify the visualization data associated with the first visualization in response to the modification request received from the first client; and automatically transmit the visualization data modified in response to the modification request to the first client and the second client, the automatically transmitting including:

determining whether a visualization mode associated with the first visualization is a synchronized mode or an independent mode;

responsive to a first indication that the visualization mode is the synchronized mode, pushing the modified visualization data to the first visualization and the second visualization in each of the first and second clients; and responsive to a second indication that the visualization mode is the independent mode, pushing the modified visualization data only to the first visualization in each of the first and second clients.

* * * * *

UNITED STATES PATENT AND TRADEMARK OFFICE

CERTIFICATE OF CORRECTION

PATENT NO. : 8,250,019 B2
APPLICATION NO. : 12/487839
DATED : August 21, 2012
INVENTOR(S) : Paulk et al.

It is certified that error appears in the above-identified patent and that said Letters Patent is hereby corrected as shown below:

On the Title Page

Item (56), in column 2, under “Other Publications”, line 1, before “Starlight”, insert --“--, therefor Item (56), in column 2, under “Other Publications”, line 1, after “Technologies;”, insert --”--, therefor Item (56), in column 2, under “Other Publications”, line 5, before “Collaborative”, insert --“--, therefor Item (56), in column 2, under “Other Publications”, line 6, after “Lab;”, insert --”--, therefor In the Specification In column 2, line 61, after “invention”, insert --;--, therefor In column 3, line 50, delete ““visualizations,””, and insert --“visualizations”--, therefor In column 4, line 27, delete “104a,”, and insert --108a,--, therefor In column 4, line 27, delete “104b,”, and insert --108b,--, therefor In column 4, line 28, delete “104c.”, and insert --108c.--, therefor In column 4, line 50, delete “108”, and insert --102--, therefor In column 5, line 59, delete “108”, and insert --102--, therefor In column 6, line 14, delete “101,”, and insert --102,--, therefor Signed and Sealed this
Fourth Day of November, 2014

Michelle K. Lee
*Deputy Director of the United States Patent and Trademark Office*

In column 6, line 35, delete “208”, and insert --202--, therefor

In column 6, line 36, delete “210.”, and insert --220.--, therefor

In column 6, line 60, delete “A”, and insert --As--, therefor

In column 6, line 61, delete “310c”, and insert --320c--, therefor

In column 7, line 21, after “408”, insert --.--, therefor

In column 7, line 42, delete “404a,”, and insert --408a,--, therefor

In column 7, line 42, delete “404b,”, and insert --408b,--, therefor

In column 7, line 43, delete “404c.”, and insert --408c.--, therefor

In column 7, line 66, delete “408”, and insert --402--, therefor

In column 8, line 24, delete “108”, and insert --408--, therefor

In column 8, line 25, delete “102”, and insert --402--, therefor

In column 8, line 32, delete “110”, and insert --410--, therefor

In column 8, line 33, after “are”, delete “operable to”, therefor

In column 8, line 36, delete “106”, and insert --406--, therefor

In column 8, line 63, delete “408”, and insert --402--, therefor

In column 9, line 12, delete “401,”, and insert --402,--, therefor

In column 9, line 13, delete “401,”, and insert --402,--, therefor

In column 9, line 15, delete “110”, and insert --410--, therefor